United States Patent [19]

Birch

[11] Patent Number: 5,923,755
[45] Date of Patent: Jul. 13, 1999

[54] MULTI-SERVICE DATA RECEIVER ARCHITECTURE

[75] Inventor: Christopher H. Birch, Toronto, Canada

[73] Assignee: Scientific-Atlanta, Inc., Norcross, Ga.

[21] Appl. No.: 08/896,634

[22] Filed: Jul. 18, 1997

Related U.S. Application Data

[63] Continuation of application No. 08/605,718, Feb. 22, 1996, abandoned, which is a continuation of application No. 08/161,159, Dec. 3, 1993, abandoned.

[51] Int. Cl.⁶ ................................................. H04N 7/08
[52] U.S. Cl. .......................... 380/20; 380/49; 348/423; 348/465
[58] Field of Search ..................... 380/20, 49; 348/7, 348/423, 465; 370/85.11, 85.9

[56] References Cited

U.S. PATENT DOCUMENTS

| | | | |
|---|---|---|---|
| 4,652,903 | 3/1987 | Lucas | 358/11 |
| 4,669,079 | 5/1987 | Blum | 370/85 |
| 4,697,277 | 9/1987 | van Rassal | 375/116 |
| 4,723,283 | 2/1988 | Nagasawa et al. . | |
| 4,744,080 | 5/1988 | Brennand et al. . | |
| 4,763,357 | 8/1988 | Barr . | |
| 4,787,085 | 11/1988 | Suto et al. . | |
| 4,817,142 | 3/1989 | van Rassal | 380/15 |
| 4,829,569 | 5/1989 | Seth-Smith et al. | 380/10 |
| 4,866,770 | 9/1989 | Seth-Smith et al. | 380/20 |
| 4,890,321 | 12/1989 | Seth-Smith et al. | 380/20 |
| 4,994,909 | 2/1991 | Graves et al. . | |
| 5,062,105 | 10/1991 | McKnight et al. . | |
| 5,172,373 | 12/1992 | Suzuki et al. | 370/85.11 |
| 5,181,113 | 1/1993 | Chang . | |
| 5,200,823 | 4/1993 | Yoneda et al. | 358/146 |
| 5,216,503 | 6/1993 | Paik et al. | 348/390 |
| 5,241,594 | 8/1993 | Kung . | |
| 5,315,584 | 5/1994 | Savary et al. | 370/18 |
| 5,359,601 | 10/1994 | Wasilewski et al. | 370/73 |

OTHER PUBLICATIONS

"Requirements and Method for High–level Multiplexing of MPEG and Other Digital Service Bitstreams with Universal Transport Layer," Anthony J. Wasilewski, International Organization for Standardization, ISO/IEC JTC1/SC2/WG11 MPEG 92 (Nov. 2, 1992).

*Primary Examiner*—Gilberto Barron, Jr.
*Attorney, Agent, or Firm*—Kenneth M. Massaroni; Kelly A. Gardner; Hubert J. Barnhardt, III

[57] ABSTRACT

A flexible architecture for a digital data receiver including a demultiplexer is provided which allows modular addition of data processors with low complexity and minimal memory requirements. The demultiplexer operates on a scalable frame-based multiplex signal, and interprets the multiplex control data at the start of the frame. With the information interpreted from the control data, the demultiplexer separates individual data services and optionally decrypts them. Data, a data clock and an error flag signal are presented to the demultiplexer input. According to a service requested by a user, the demultiplexer outputs decrypted data clock, error flag and service enable signals in a flow-through manner to an appropriate data processor without data storage.

74 Claims, 14 Drawing Sheets

| DESCRIPTION (USES 135 BYTES OF MUX) | BITS (144) | |
|---|---|---|
| STRUCTURE CONTROL TYPE | 8 | |
| END OF PACKETS MARKER (ACTUAL BYTE LOCATION) | 17 | |
| END OF AUDIO MARKER (ACTUAL BYTE LOCATION) | 17 | |
| END OF VIDEO MARKER (ACTUAL BYTE LOCATION) | 17 | |
| NUMBER OF 45 BYTE PACKETS INCLUDING FEC(-> 6) | 6 | REGION 1 EXTRA PROTECTION |
| NUMBER OF 75 BYTE PACKETS INCLUDING FEC(-> 10) | 5 | |
| NUMBER OF 10 BYTE PACKETS | 5 | |
| NUMBER OF 5 BYTE PACKETS | 5 | |
| NUMBER OF 32 BYTE PACKETS | 12 | REGION 2 R-S ONLY |
| NUMBER OF 42 BYTE PACKETS | 12 | |
| NUMBER OF BYTES / AUDIO BLOCK | 8 | |
| NUMBER OF BYTES / VIDEO BLOCK | 8 | |
| NUMBER OF BYTES PER OSP PACKET | 8 | |
| CRYPTO-CYCLE COUNT (OF PRESENT FRAME) | 8 | |
| CRYPTO-CYCLE LENGTH ( 50 Hz FRAMES ) | 8 | |

FIG.8

| DESCRIPTION | BITS (48) |
|---|---|
| AUDIO CONTROL PACKET HEADER (100010) | 6 |
| SPARE | 2 |
| NUMBER OF BYTES IN CHANNEL 1 | 4 |
| NUMBER OF BYTES IN CHANNEL 2 | 4 |
| NUMBER OF BYTES IN CHANNEL 3 | 4 |
| NUMBER OF BYTES IN CHANNEL 4 | 4 |
| NUMBER OF BYTES IN CHANNEL 5 | 4 |
| NUMBER OF BYTES IN CHANNEL 6 | 4 |
| NUMBER OF BYTES IN CHANNEL 7 | 4 |
| NUMBER OF BYTES IN CHANNEL 8 | 4 |
| NUMBER OF BYTES IN CHANNEL 9 | 4 |
| NUMBER OF BYTES IN CHANNEL 10 | 4 |

FIG.9a

| DESCRIPTION | BITS (48) |
|---|---|
| AUDIO SERVICE DESCRIPTOR PACKET HEADER (100011) | 6 |
| SPARE | 2 |
| SPARE | 2 |
| AUDIO SERVICE STREAM NUMBER | 6 |
| SPARE | 8 |
| SPARE | 7 |
| NUMBER OF BYTES OF ACTUAL AUDIO DATA | 17 |

FIG.9b

| DESCRIPTION | BITS (48) |
|---|---|
| VIDEO CONTROL PACKET HEADER (100100) | 6 |
| SPARE | 2 |
| NUMBER OF BYTES IN CHANNEL 1 | 8 |
| NUMBER OF BYTES IN CHANNEL 2 | 8 |
| NUMBER OF BYTES IN CHANNEL 3 | 8 |
| NUMBER OF BYTES IN CHANNEL 4 | 8 |
| NUMBER OF BYTES IN CHANNEL 5 | 8 |

FIG.10a

| DESCRIPTION | BITS (48) |
|---|---|
| VIDEO SERVICE DESCRIPTOR PACKET HEADER (100101) | 6 |
| SPARE | 2 |
| SPARE | 3 |
| VIDEO SERVICE STREAM NUMBER | 5 |
| SPARE | 7 |
| HDTV VIDEO OUTPUT | 1 |
| SPARE | 7 |
| NUMBER OF BYTES OF ACTUAL VIDEO DATA | 17 |

FIG.10b

MULTI-SERVICE DATA RECEIVER ARCHITECTURE

This is a continuation of U.S. patent application Ser. No. 08/605,718, filed Feb. 22, 1996 now abandoned, which is a continuation of U.S. application Ser. No. 08/161,159, filed Dec. 3, 1993 now abandoned, and is related by subject matter to U.S. application Ser. No. 161,160, entitled "System and Method for Transmitting a Plurality of Digital Services Including Imaging Services" now U.S. Pat. No. 5,583,562; U.S. application Ser. No. 160,828, entitled "System and Method for Transmitting a Plurality of Digital Services Including Compressed Imaging Services and Associated Ancillary Data Services;" now U.S. Pat. No. 5,493,339 U.S. application Ser. No. 160,841, entitled "Memory Efficient Method and Apparatus for Synch Detection;" now U.S. Pat. No. 5,420,640; U.S. application Ser. No. 160,839, entitled "Method and Apparatus for Locating and Tracking a QPSK Carrier now abandoned;" and U.S. application Ser. No. 160,827, entitled "System and Method for Providing Compressed Digital Teletext Services and Teletext Support Services" filed Dec. 3, 1993 now U.S. Pat. No. 5,519,780.

FIELD OF THE INVENTION

The present invention relates generally to digital signal transmission, and more particularly, to an architecture for a data receiver including a demultiplexer which allows modular addition of data processors.

BACKGROUND OF THE INVENTION

The background of the present invention is described herein in the context of pay television systems, such as cable television and direct broadcast satellite (DBS) systems, that distribute a variety of program services to subscribers, but the invention is by no means limited thereto.

In the pay television industry, "programmers" produce "programs" for distribution to various remote locations. A "program" is a collection of related services, including but not limited to video, audio, closed-captioning and teletext services. A single programmer may wish to supply a variety of such services. Typically, a programmer will supply these services via satellite to individual subscribers (i.e., DBS subscribers and/or cable television operators). In the case of cable television operators, the services transmitted via satellite are received at the operator's "cable head-end" installations. A cable operator typically receives programs and other services from many programmers and then distributes them to its subscribers. In addition, a cable operator may insert locally produced services at the cable head-end. The selected services and locally produced services are then transmitted to the individual subscribers via a coaxial cable distribution network. In the case of the DBS subscribers, each subscriber is capable of receiving a satellite down-link from the programmers directly.

In the past, pay television systems, including cable and DBS systems, have operated in the analog domain. Recently, however, the pay television industry has begun to move toward all digital systems wherein prior to transmission, all analog signals are converted to digital signals. Digital signal transmission offers the advantage that digital data can be processed at both the transmission and reception ends to improve picture quality. In addition, digital data compression techniques have been developed that achieve high signal compression ratios. Digital compression allows a larger number of individual services to be transmitted within a fixed bandwidth. Bandwidth limitations are imposed by both satellite transponders and coaxial cable distribution networks, and therefore, digital compression is extremely advantageous.

In addition, there is a growing trend toward a merger of the previously separate technologies of telecommunications including voice and data telecommunications and television including satellite, broadcast and cable television. There has emerged an increased interest in developing adaptable transmission systems capable of handling any one or more of a collection or plurality of such services. The primary media investigated for providing such services to data comprise, for example, coaxial cable, land-based microwave, so-called cellular radio, broadcast FM, broadcast satellite and optical fiber, to name a few. It is desirable that the decoder in such adaptable transmission systems be flexible so that a subscriber can easily arrange the decoder to accept those services selected by the subscriber.

Each media has its own characteristics. For example, comparing cable and satellite for digital data transmission, cable tends to have a medium error rate, but when errors appear, the errors come in long bursts. Satellite as a media has a fairly poor error rate, primarily due to the requisite weak signal power, and hence, low signal to noise ratio. In satellite, then, the poor error rate is specially corrected utilizing such techniques as convolutional error correctors, not required in a cable environment.

In copending U.S. application Ser. No. 07/968,846, filed Oct. 30, 1992 and entitled "System and Method for Transmitting a Plurality of Digital Services," now U.S. Pat. No. 5,400,401 there is described an encoder for generating a multiplexed data stream carrying services to remote locations via, for example, a satellite or a cable distribution network. The generated data stream comprises a continuous sequence of frames, each frame comprising two fields, and each field comprising a plurality of lines. A first group of lines of a field defines a transport layer and a second group of line defines a service data region. A feature of the disclosed scheme is the ability to dynamically vary the multiplexed data stream from field to field. Another feature of the disclosed scheme is that the data transmission rate of the multiplexed data stream is related to the frequency of known analog video formats, i.e. frame, field and horizontal line rates.

The multiplex data stream generated by the encoder is transmitted to a plurality of remote locations. Each of the remote locations is provided with a decoder for receiving a multiplex data stream and extracting selected services therefrom. A block diagram of such a decoder 280 is shown in FIG. 1. Video services, for example, may be extracted from the multiplex data stream 288 and displayed on a display device 306 at the remote location. In greater detail, the decoder receives successive fields of the multiplex data stream and, for each field, extracts a multiplex map from the field to determine the content of the transport layer region of that field. With the multiplex map, the decoder 280 is able to extract the system data packets and the multiplex control packet from the transport layer region. In response to a user service selection 296, the decoder 280 examines the multiplex control packet for each field to determine which portion of the service data region of that field is allocated to the selected service. Once the correct portion has been identified, the decoder 280 is able to extract the selected service data from that field. As shown in FIG. 1, the decoder described in copending U.S. application Ser. No. 07/968,846 now U.S. Pat. No. 5,400,401 is capable of extracting only four audio services or channels at a time. In addition, the decoder of FIG. 1 is also limited in its ability to handle video services. In sum, the architecture of the decoder of FIG. 1 has only limited flexibility and is specific to a limited configuration of user equipment.

In copending U.S. application Ser. No. 07/970,918 filed Nov. 2, 1992, entitled "System and Method for Multiplexing a Plurality of Digital Program Services for Transmission to Remote Locations," now U.S. Pat. No. 5,319,707 there is described another system, this for Multiplexing a plurality of digital program services comprising a collection of, for example, video, audio, teletext, closed-captioning and "other data" services. According to the disclosed scheme, a plurality of subframe data streams are generated, each having a transport layer region and a program data region. These subframe data streams are then multiplexed together into superframes having a transport layer region and a subframe data region.

As shown in FIG. 2, a decoder 36 is provided at each remote location. The decoder 36 receives a multiplex data stream and extracts a superframe map from each incoming superframe. With the superframe map, the decoder is able to extract the individual subframes from each superframe, thereby recovering each subframe data stream from the multiplex data stream. From a selected subframe data stream, the decoder extracts the subframe multiplex map from each successive subframe in that subframe data stream in order to determine the location of the program multiplex control packet within each subframe. With the program multiplex control packets, the decoder is able to determine which portion of the program data region of each subframe is allocated to a selected program. In this manner, the decoder is then able to extract the selected program. The decoder 36 of FIG. 2 is capable of handling a limited number of video and audio services, as depicted by the drawing.

The decoders shown in FIGS. 1 and 2 thus both exhibit highly structured architectures which allow only for a limited arrangement of services to be received by the subscriber. While these disclosed transmission systems permit a variety of services to be transmitted over various media to remote locations, there remains a need to provide yet other alternative arrangements more particularly adapted to the wide variety of services that may be offered over various media and permit the end user at the remote location greater flexibility over the data content the user is ultimately enabled to receive. Moreover, such a system should be able to be easily adapted to transmit an increasing number of different services in an increasingly efficient manner, for example, utilizing the same or less bandwidth.

Since such services as high definition color television services, so-called "surround-sound" digital audio services, interactive transactional service for home-shopping, reservations, first-run as well as classic movie programming, software delivery, interactive games, alarm services, energy management and such all involve different bandwidths, data formats and such, there remains a need for flexibility in the overall structure provided for transmitting such services. Moreover, a user should not be presented with an overwhelming number of choices, but should be able, in a user-friendly manner, to select only those services which he is capable of receiving or wants to receive. Ideally, the user should be able to have access to an infinite variety of data services, selectable as he chooses, so that he may, for example, watch a first run movie in so-called high definition format accompanied by a "surround-sound" audio in the language of his choice and, at the same time, receive a facsimile or voice communication over the same media. If the user is equipment-limited, for example, to a standard resolution television and a telephone set, the user should be able to fashion the delivery of services to he equipment he owns. Thus, there remains a need for a highly flexible, expandable architecture of a decoder adaptable to receive different services.

SUMMARY OF THE INVENTION

Briefly stated, the present invention is directed to an architecture for a data receiver including a demultiplexer for receiving digital programs from an origination point. The present invention is intended for use in a digital service transmission system capable of delivering multiple, error-corrected data services. A program may comprise a collection of related digital services including video, audio, teletext, closed-captioning and "other data" services. According to the present invention, a data receiver architecture is provided which accepts a signal of the form described by copending U.S. application Ser. No. 07/968, 846 now U.S. Pat. No. 5,400,401, copending U.S. application Ser. No. 07/970,918 now U.S. Pat. No. 5,319,707 and copending U.S. application Ser. No. 161,160, filed Dec. 3, 1993 now U.S. Pat. No. 5,583,562 and which allows modular addition of data processors with low complexity. More specifically, the data receiver demultiplexer architecture has a "flow-through" structure which eliminates the need for large local data storage, and thus reduces the implementation costs.

One preferred embodiment is an apparatus for use in a system for receiving a frame of information data preceded by control data describing the information data. The apparatus uses a demultiplexer controlled by a microcomputer for receiving the control data and information data, and for determining a type of the information data based on the control data. A bus structure is provided for transporting the information data from the demultiplexer to a data processor based on the control data.

BRIEF DESCRIPTION OF THE DRAWINGS

FIG. 7 is a block diagram of the demultiplexer operation of the demultiplexer shown in FIG. 6a.

FIG. 8 is a table showing one example of a multiplex structure control word of PACKETS data according to the present invention which immediately follows vertical synchronization in a transmitted frame of the present invention.

FIGS. 9a and 9b are tables showing examples of audio control and audio service descriptor words of PACKETS data for describing medium speed (audio) data services included within a particular transmitted frame.

FIGS. 10a and 10b are tables showing examples of video control and video service descriptor words of PACKETS data for describing high speed (video) data services included within a particular transmitted frame.

DETAILED DESCRIPTION OF THE INVENTION

Figure 1:
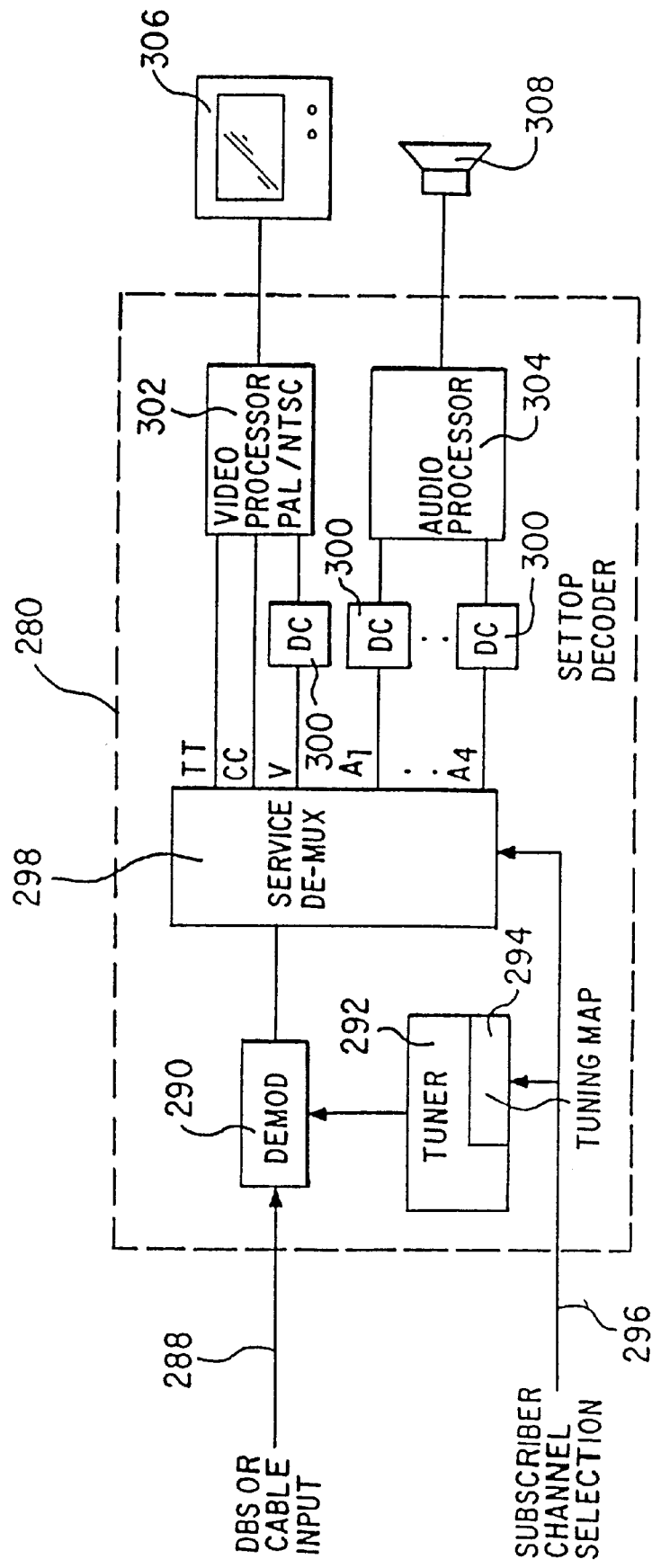
FIG. 1 is a block diagram of a decoder with a highly structured architecture.
Figure 2:
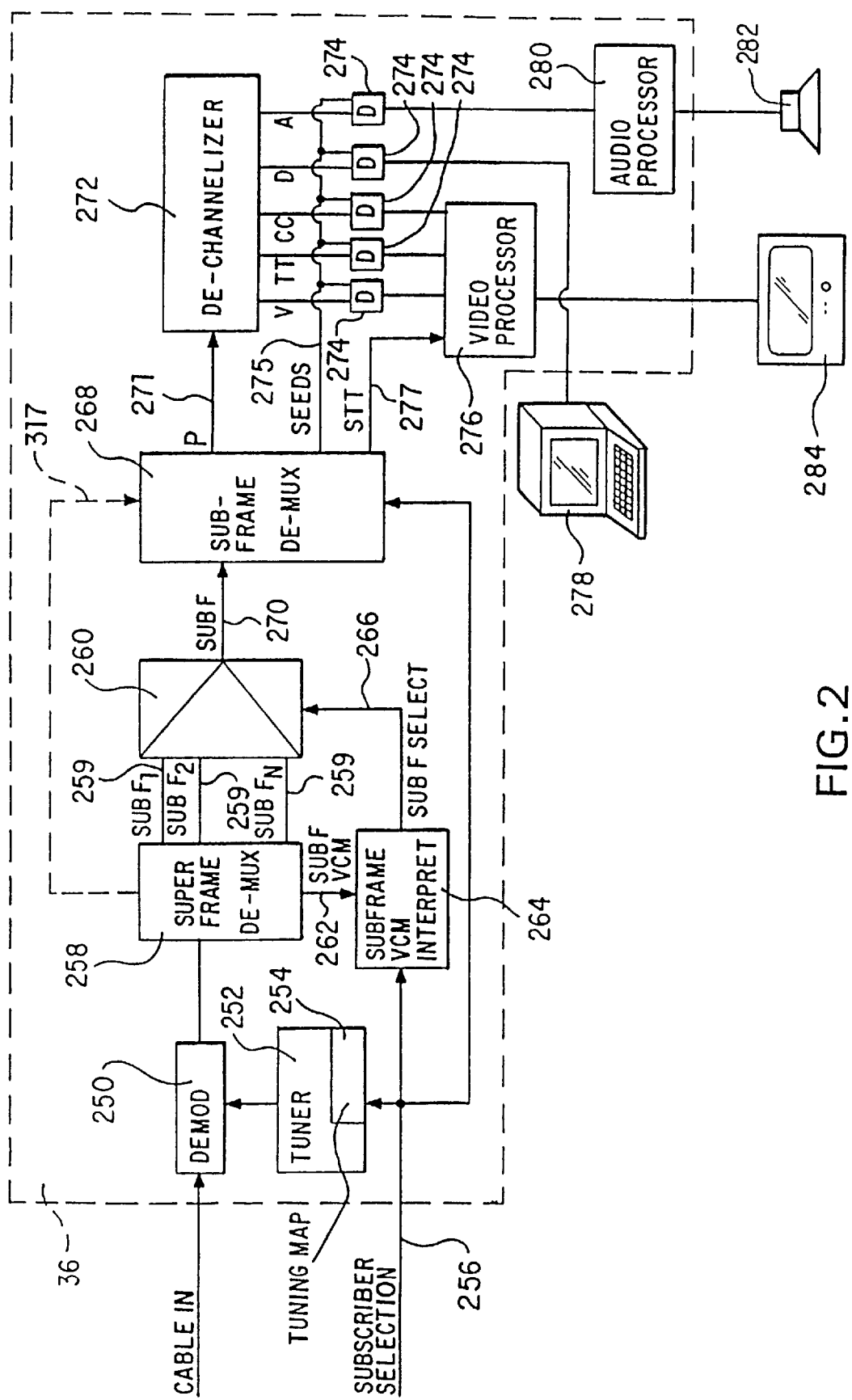
FIG. 2 is a block diagram of a second decoder with a highly structured architecture.
Figure 3:
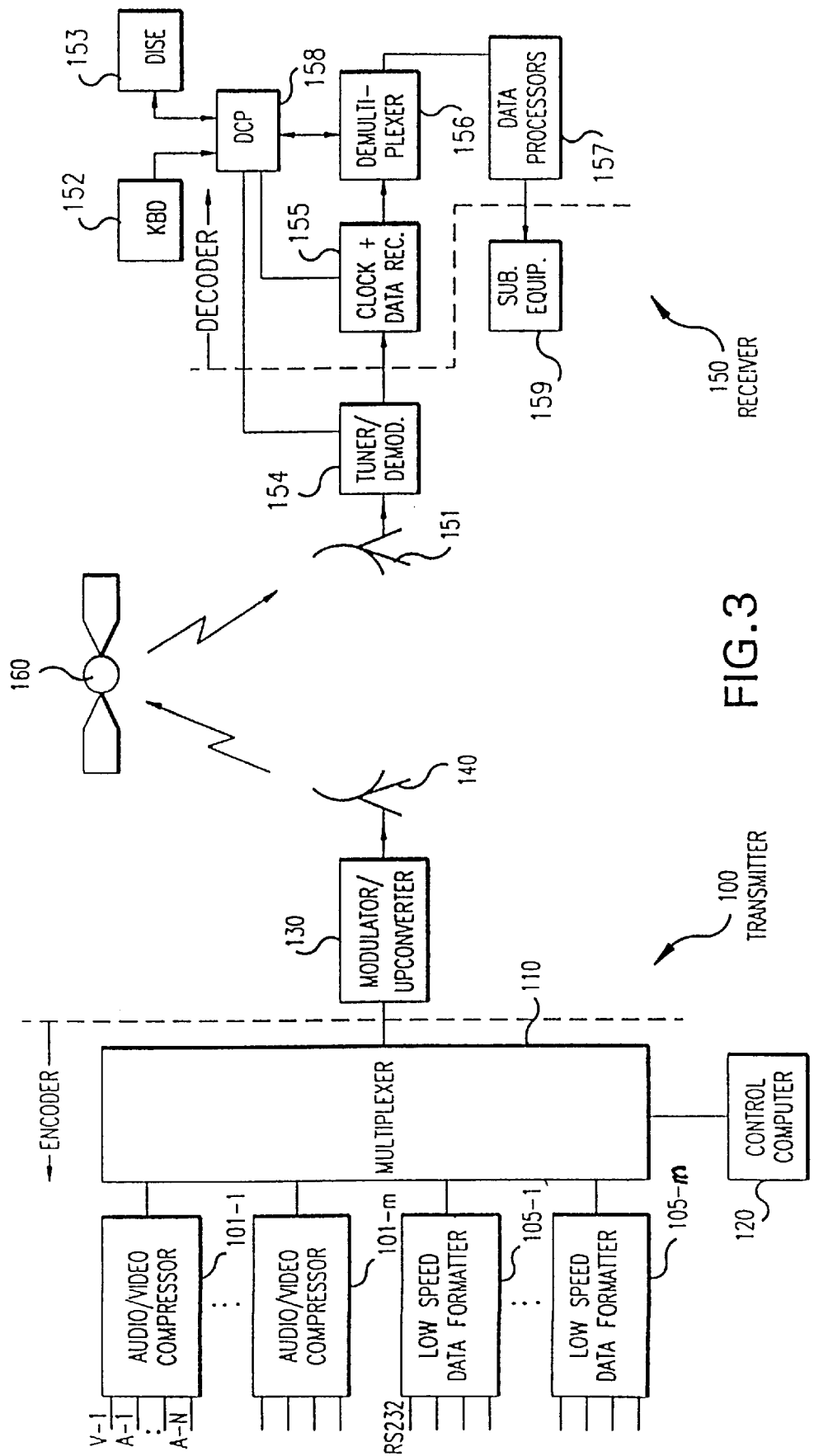
FIG. 3 is a block diagram showing a transmitter site 100 including an encoder and a receiver site 150 including a decoder according to the present invention for transmitting low data rate, medium data rate (audio) and high data rate (video) data implemented in a satellite communications system.

Referring to FIG. 3, there is shown a transmitter site 100 including an encoder and a receiver site 150 including a decoder according to the present invention applied in the environment of a satellite communications system. Audio/video compressor circuits 101(1) to 101(m) are shown for individually receiving audio service data and/or video service data, for example, from a plurality of programmers providing such services. One such MPEG video compressor known in the art is a National Transcommunications, Ltd. (England) NTL 2000 V compressor. Similarly, a plurality of low data rate, for example, RS232 digital data services are received at low speed data formatters 105(1) . . . 105(m). The audio video compressors compress the received medium and high data rate data in accordance with known algorithms (for example, in accordance with currently known or proposed standards such as MPEG I or II, audio or video). The data formatters strip parity, start, and stop bits and other non-information payload data from the incoming formatted data and reformat the data into PACKETS data as will be further described herein.

Control computer 120 controls multiplexer 110 to time division multiplex the compressed medium and high data rate streams output from compressors 101(1) . . . 101(m) and the low data rate streams output from formatters 105(1) to (n) into a serial data stream for output to modulator 130. The high speed data link connecting multiplexer 110 and modulator 130 may be coaxial cable, optical fiber or twisted pair, so long as the transmission is relatively noise free and at sufficient data rate. Modulator 130 then modulates the digital data stream on to a carrier and upconverts the carrier as necessary for transmission via, for example, C or Ku band frequencies through a satellite antenna 140. Modulator 130 may preferably comprise a quadrature phase shift key (QPSK) modulator known in the art for satellite transmission. Satellite antenna 140 beams a signal including the modulated data to satellite 160 which may be functionally referred to as a transponder. Transponder 160 simply repeats the received signal toward earth and satellite receiver antenna 151.

Receiver site 150 typically includes a tuner/demodulator 154 for selecting one of a plurality of channels to which satellite tuner/demodulator 154 may be tuned. Tuner/demodulator 154 downconverts and outputs a demodulated data stream to clock and data recovery circuit 155. Clock and data recovery circuit 155 in turn outputs an error corrected data stream and synchronization data to demultiplexer 156. Demultiplexer 156 under control of a decoder computer 158 outputs demultiplexed data streams to various output ports to subscriber equipment 159 via peripheral data processors 157, as described in further detail below.

The subscriber equipment 159 may comprise, for example, standard or high definition television reception equipment, digital audio reception equipment, digital data processors or computers, video game equipment, facsimile receiver/printers, energy management equipment and the like.

The receiver site 150 may not only be a subscriber to services but may be a provider of services such as a cable television system operator. In such a scenario, the receiver site 150 may not include typical subscriber equipment 159 but may include cable television system head-end equipment known in the art including television modulators and digital audio service providing equipment and the like.

Figure 4A:
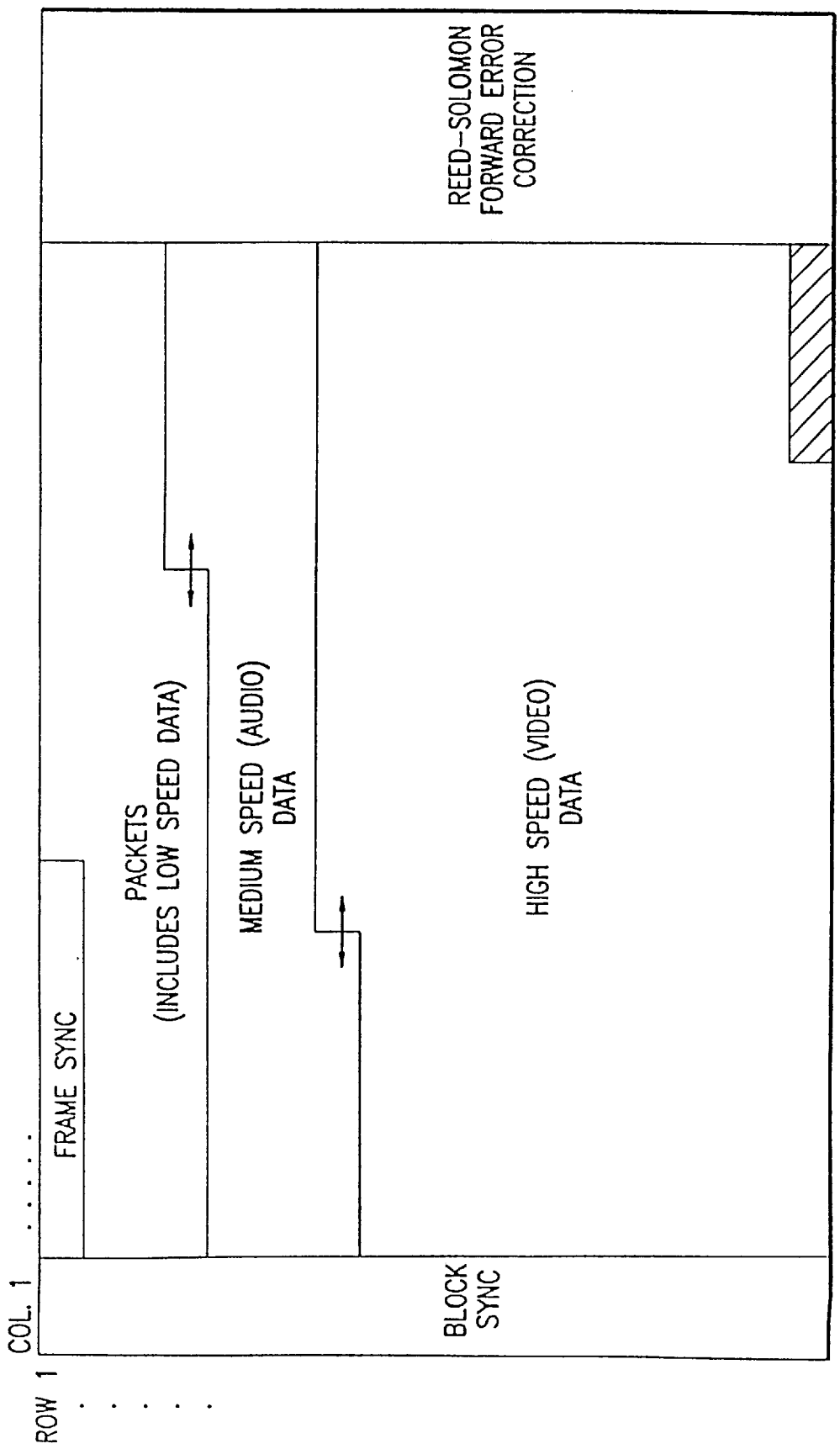
FIG. 4a is a diagram showing a scalable multiplex frame, including synchronization words BLOCK SYNC and FRAME SYNC, for transmitting a digital data stream of low data rate (included within PACKETS), medium data rate (audio) and high data rate (video) data protected by Reed-Solomon encoding according to the present invention.

Referring now to FIG. 4a, there is shown a generic frame of the type used in the present invention having highly flexible characteristics. The subject matter of this generic frame is further described in detail in copending U.S. application Ser. No. 08/161,160, entitled, "System and Method for Transmitting a Plurality of Digital Services Including Imaging Services," filed Dec. 3, 1993 and which is herein specifically incorporated by reference now U.S. Pat. No. 5,583,562. The static or fixed elements of the depicted scalable multiplex are BLOCK SYNC for the first row and FRAME SYNC. All other depicted elements of the frame are flexible and may change from medium to medium and from frame to frame. For example, Reed-Solomon error correction parity data may be provided for satellite transmission and omitted for less error prone forms of media. PACKETS data comprises control information and low speed data services.

Moreover, the delineation between what is shown as PACKETS data and areas for medium speed (audio) and high speed (video) data portions are flexible, and the figure is not intended to show that the boundaries between such forms of data is fixed at any one point in the frame. A predetermined structure is provided to the frame in that FRAME SYNC follows the first byte of BLOCK SYNC in a frame. PACKETS data follows FRAME SYNC, followed in turn by medium speed (audio) and high speed (video) data in that order. There will always be some PACKETS data for control purposes but, depending on the priorities of data services to be transmitted, there may not exist low speed data portions thereof, medium speed data sections or high speed data sections of a particular frame.

The depicted frame is intended to show that each particular frame comprises a fixed number of bits in a horizontal direction which may for convenience be defined as a predetermined number of bits of data. A practical maximum number of bytes (of eight bits each) in a horizontal direction is 256 including BLOCK SYNC, limited primarily by the 255 byte capacity of Reed-Solomon decoding integrated circuits available in the market. This horizontal dimension measured in bits (256 bytes×8=2048 bits), sometimes referred to herein in terms of columns of bytes, may vary from one particular frame to the next transmitted frame. Typically, however, once a selection of data services is made for transmission, the frame structure in a horizontal and vertical dimension will remain constant (see FIG. 4c).

By PACKETS is intended to refer to a collection of, for example, control or system data blocks which are intended to signal or control a receiver 150 to, for example, identify the data types or data services and the respective data beginning and ending boundaries to follow as well as provide a basis upon which an end user may control his receiver to receive and output data services as he/she chooses. In other words, the user's selection of services is only limited by his/her on-hand equipment and his/her preferences to particular ones of the services in particular arrangements of the various multiplexed data streams or blocks that follow in the data stream.

By low speed data is intended teletext, facsimile, conditional access, alarm, energy management, certain audio and other data streams which typically exhibit data rates of less than sixty-four kilobytes per second. By medium speed data is intended more sophisticated forms of audio such as "surround-sound" and medium speed data rates between, for example, 64 kilobytes per second and T1 carrier or D1 (telecommunications) rates of approximately one megabit per second. Medium speed audio data is preferably compressed in accordance with well-known audio compression algorithms known in the art. Then, by high speed data, is intended some compressed forms of video transmission up to data rates required for high definition color television (HDTV), be it in a MUSE, European, so-called Grand Alliance proposed U.S. format or other HDTV format. Such a structure is not intended to be fixed; for example, the present suggested data rates may be broken into only two regions of low and high speed data. Nevertheless, for example, low speed data will always be included within PACKETS data and precede higher speed data sections of the frame, and high speed data will always follow slower speed data and precede the first BLOCK SYNC and FRAME SYNC words for the next frame.

Figure 4B:
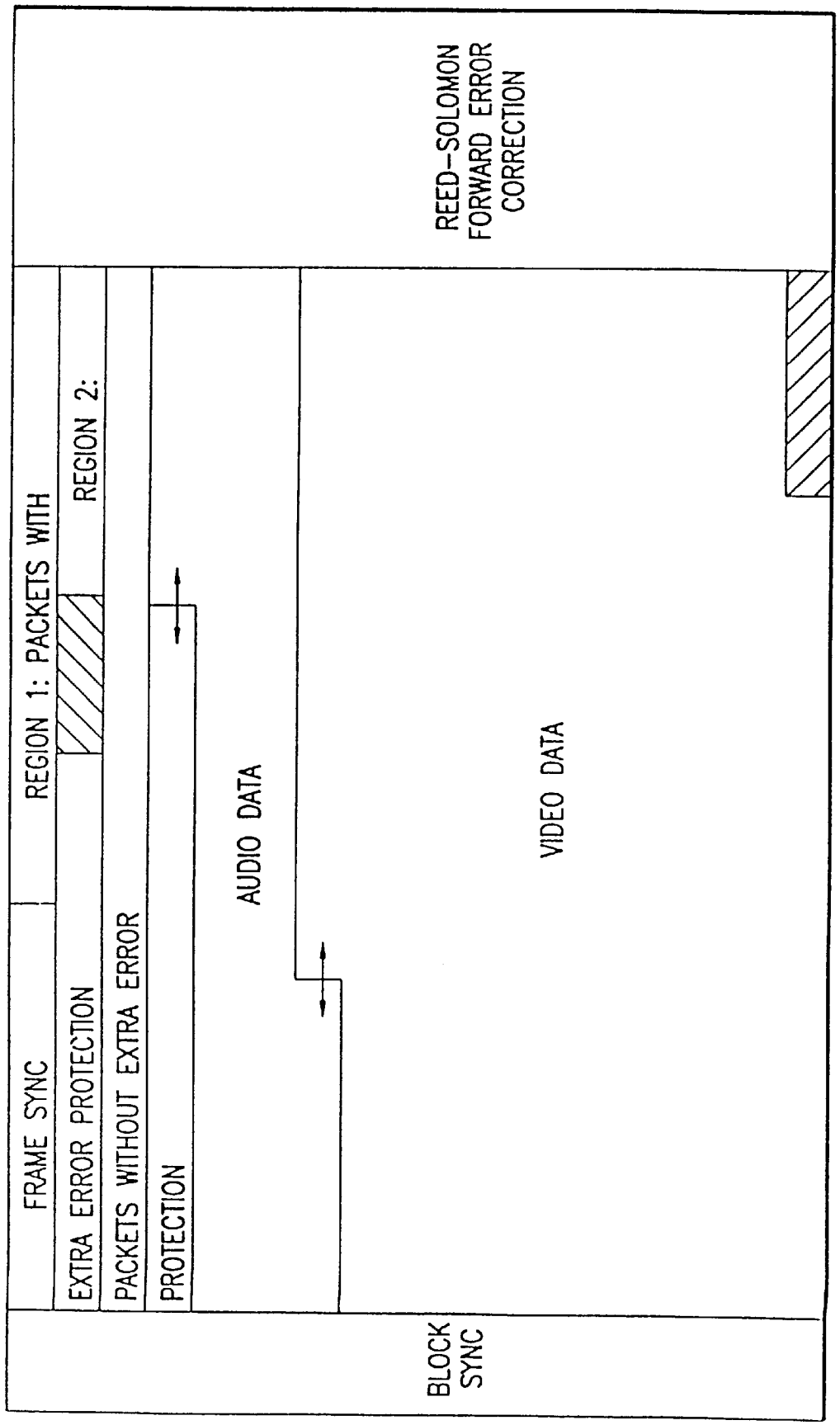
FIG. 4b is a second diagram of the frame of FIG. 4a wherein the PACKETS area is further broken down into first and second regions, the first region including packets with extra error protection and the second region including data protected only by Reed-Solomon encoding.

As shown in FIG. 4b, the PACKETS area can be broken down into first and second regions. The first region includes packets with extra error protection. The second region includes data protected only by Reed-Solomon encoding.

Figure 4C:
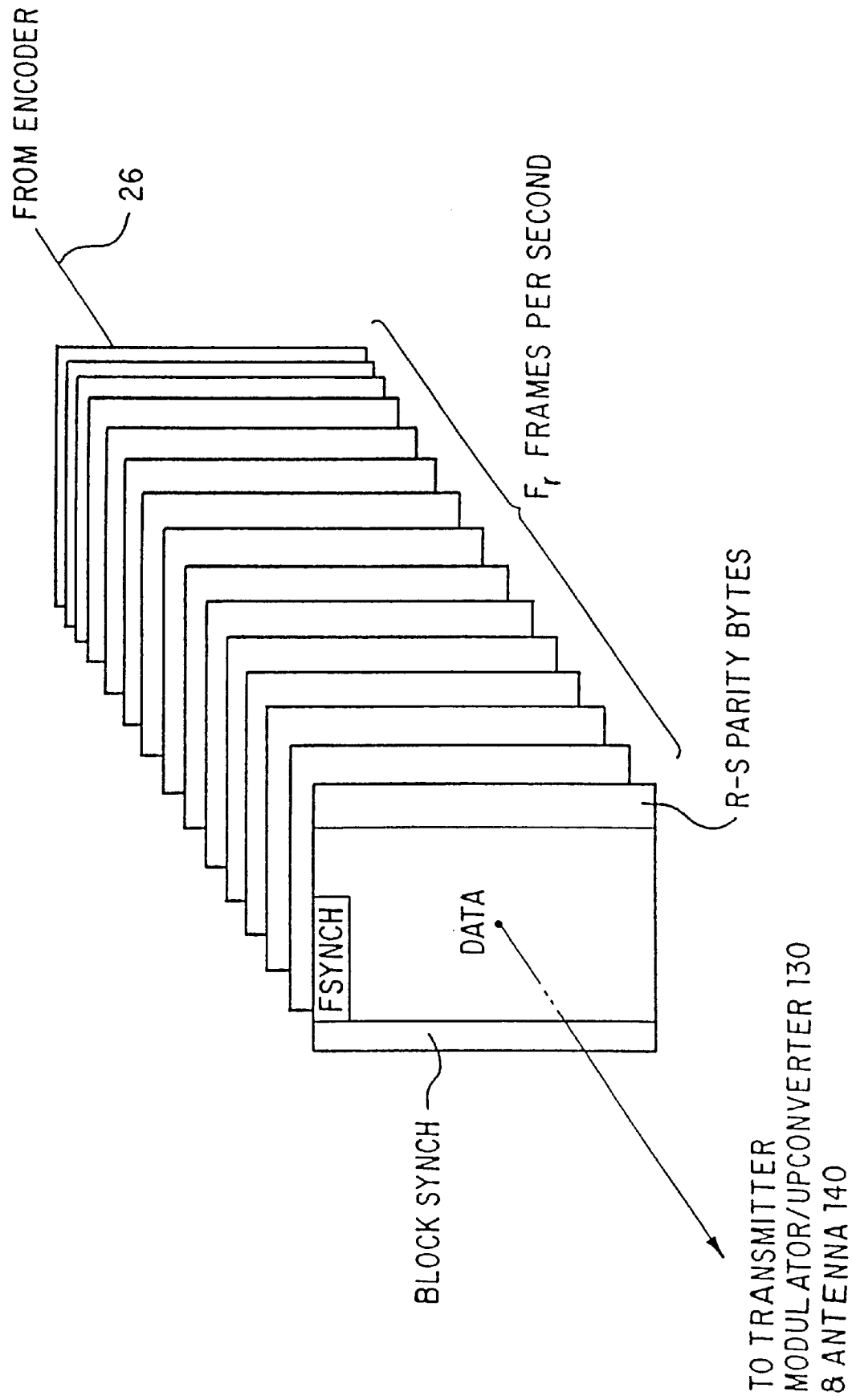
FIG. 4c is a diagram showing that a sequence of frames in the form of FIG. 4a or 4b are transmitting to a receiver according to the present invention.

As illustrated in FIG. 4c, a sequence of frames in the form of FIGS. 4a or 4b are transmitted to a receiver according to the present invention. Typically, once a selection of data services is made for transmission, the frame structure in a horizontal and vertical dimension will remain constant, as shown in FIG. 4c.

Figure 5:
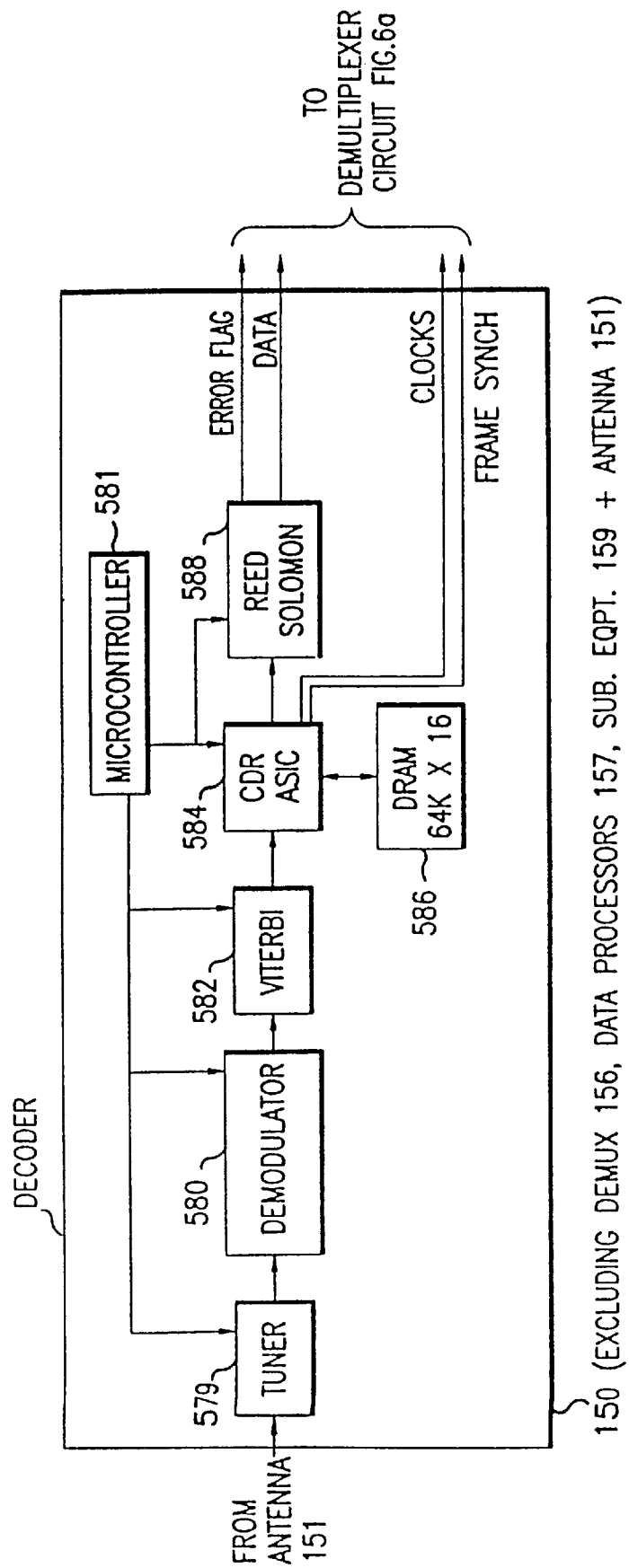
FIG. 5 is a block diagram of a portion of a receiver which is connected to the decoder of the present invention.

Referring now to FIG. 5, there is shown a receiver 150 of FIG. 3 in greater detail. Receiver 150 includes a tuner 579 and a demodulator 580 already shown comprising tuner/demodulator 154 of FIG. 3. Such components do not always comprise elements of a decoder. The tuner, for example, may preferably be a stand-alone device as may the demodulator 580. In an alternative embodiment the tuner and demodulator may comprise a stand-alone device. In yet a third alternative embodiment, the demodulator may comprise an element of the decoder.

According to FIG. 5, microcontroller 581 controls demodulator 580, Viterbi circuit 582, clock and data recovery circuit 584 and Reed Solomon decoder circuit 588. Microcontroller 581 also controls demultiplexer 612 of FIG. 6a as will be subsequently described in greater detail. Demodulator 580 comprises a standard quadrature phase shift keying QPSK demodulator and Viterbi circuit 582, a standard Viterbi error protection filter circuit known in the art, for example the Stanford Telecom STEL-2061/CM. On the other hand, clock and data recovery ASIC 584 may preferably comprise a custom integrated circuit for operating in accordance with U.S. application Ser. No. 08/160,841, entitled "Memory Efficient Method and Apparatus for Synch Detection," filed Dec. 3, 1993 and which is specifically incorporated herein by reference now U.S. Pat. No. 5,420,640. According to that application, one memory 586 is shared for synch recovery and for deinterleaving functions. First synchronization for horizontal synchronization is recovered; then, the frame synchronization recovered. The frame synchronization then signals the release of the memory for deinterleaving purposes. Memory 586 may be a standard dynamic or pseudo-static random access memory known in the art, for example, a Toshiba TC5183 pseudo-static RAM.

A data stream received from the satellite or cable system is tuned to by tuner 579 and then demodulated by demodulator 580, preferably a QPSK demodulator known in the art. This tuning procedure is further described in U.S. application Ser. No. 08/160,839, entitled "Method and Apparatus for Locating and Tracking a QPSK Carrier" filed Dec. 3, 1993 and which is specifically incorporated herein by reference now abandoned. The demodulated data stream is passed to Viterbi circuit 582 for error protection filtering. The filtered signal is passed to clock and data recovery circuit 584 which communicates with dynamic random access memory (DRAM) 586. The output of clock and data recovery circuit 584 is 1) digital service data which is passed to Reed Solomon circuit 588 for decoding, and 2) clocks. The clock and data recovery circuit first recovers horizontal synch from the BLOCK SYNC word, then vertical synch from FRAME SYNC, and then can output the digital service stream data with assurance for RS decoding at functional block 588 which may be a standard RS decoder integrated circuit known in the art.

Figure 6A:
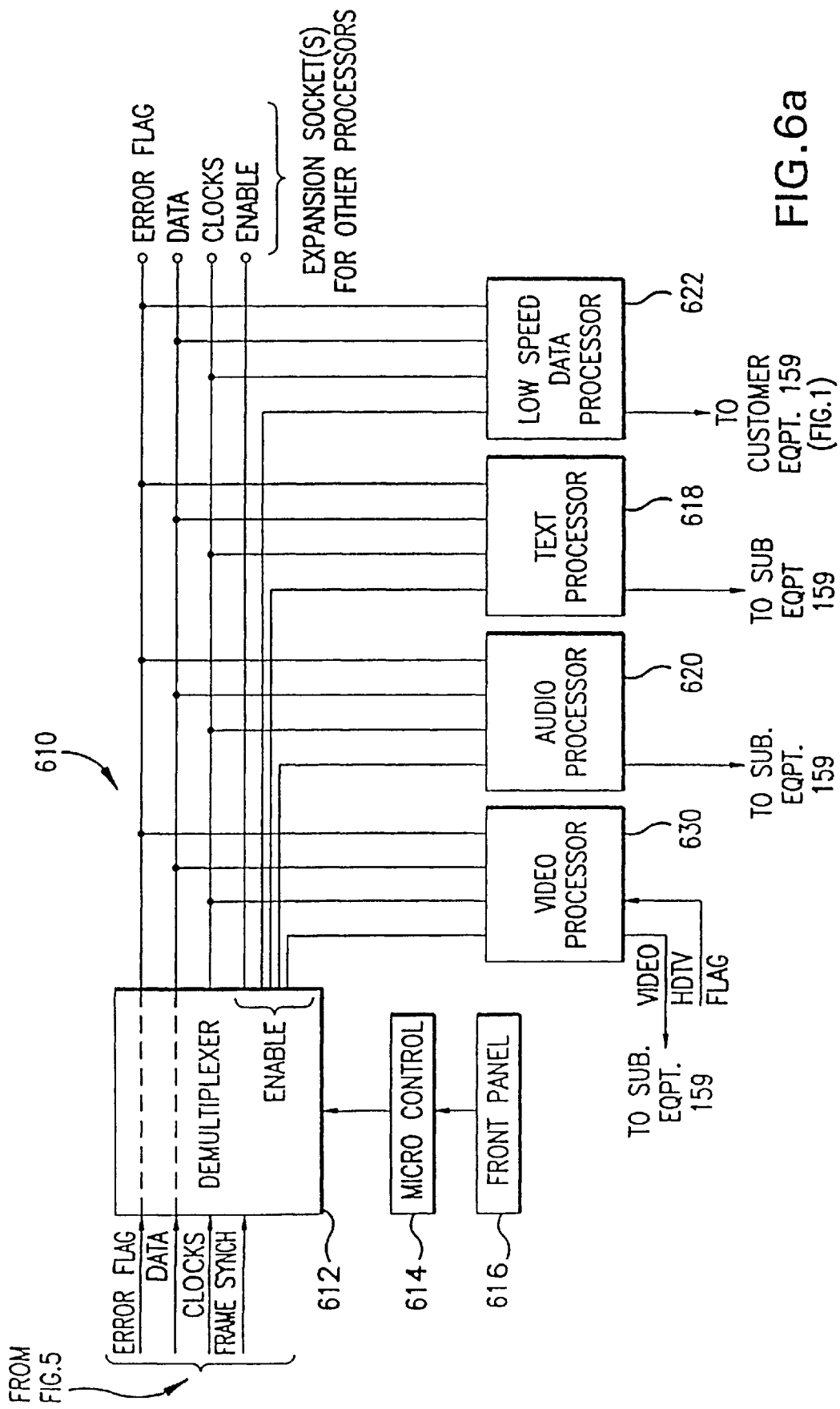
FIG. 6a is a block diagram of the decoder of the present invention.

Referring now to FIG. 6a, the output of the clock and data recovery circuit, CDR ASIC 584, is preferably passed to demultiplexer 612 (demultiplexer 156 of FIG. 3 shown in greater detail). Demultiplexer 612 is controlled preferably by the same microcontroller as microcontroller 581 of FIG. 5 which may be a decoder control processor for controlling the entire set of operations of a decoder according to the present invention. In an alternative embodiment, microcontroller 614 may be separate from microcontroller 581 and operate in sequence with that microcontroller, for example, over a common bus (not shown). Microcontroller 581/614 may operate in concert under control of a remote control or other user keyboard for tuning and control purposes as appropriate (referred to generically as front panel 616). Microcontroller 581/614 preferably comprises an appropriately selected and programmed microprocessor, such as a Motorola MCM68HC11, including on board or external read only and/or random access memory as required for the particular application.

Importantly, as shown in FIG. 6a, the present invention is directed to an improved decoder architecture which utilizes a demultiplexer and a flexible bus structure which can be easily configured to a subscriber's use requirements. As shown in FIG. 6a, the demultiplexer 612 receives Reed Solomon-corrected data and clock signals. The clock and data recovery circuit, CDR ASIC 584 (see FIG. 5), indicates the beginning of a MUX frame by the use of the FRAME SYNC pulse (active high) which is timed such that the falling edge of the pulse coincides with the first byte of the data. These signals are demultiplexed, and the demultiplexed data stream comprises, for example, video, audio, text and low speed data streams which may be gated into respective data processors, for example, data processors 630, 620, 618, and 622.

More specifically, the demultiplexer 612 performs routing of all data bytes to the appropriate devices via a data bus 610, as follows. Signals provided from the clock and data recovery circuit, CDR ASIC 584, shown in FIG. 5, provide all of the information required by demultiplexer 612 to demultiplex the received signals. That is, demultiplexer 612 does not need to know the MUX frame structure in advance. The demultiplexer 612 uses DEMUX packets to determine where the different data bytes for the various data services are located in the frame. The demultiplexer 612 expects to receive its packets in a specific order: Multiplex Structure Control packets (MSCs) (shown in FIG. 8); Audio Control Packets (ACPs) (shown in FIG. 9a); Video Control Packets (VCPs) (shown in FIG. 10a); Audio Service Descriptor Packets (ASDPs) (shown in FIG. 9b); Video Service Descriptor Packets (VSDPs) (shown in FIG. 10b). The ACPs, VCPs, ASDPs, and VSDPs are grouped together into a category known as the "45 byte packets" category; they contain 6 bytes of information which is used for routing in demultiplexer 612.

The MSC packet is the first packet following FRAME SYNC, and contains control data which determines how the information contained in the MUX frame is to be demultiplexed into the appropriate output port. More specifically, demultiplexer 612 receives an active high external signal, FRAME SYNC, which frames the FRAME SYNC word. The FRAME SYNC signal clears all byte counters and routing registers of the demultiplexer 612. Microcontroller 614 interprets MSC packet data and initializes demultiplexer 612 to correspond to the MSC's structure type header. The demultiplexer 612 must have a match or it will not released any of the data it receives. Once the demultiplexer 612 determines the type of data to be output, the demultiplexer 612 controlled by microcomputer 614 enables the particular ENABLE line for the specified data service. As shown in FIG. 6a, the various data processors 630, 620, 618 and 622 are each equipped with an enable pin which is connected to a respective enable output on demultiplexer 612. In this way, once demultiplexer 612 identifies from the MSC the type of data to be output based on the control data therein, the correct data processor can be enabled and the information data contained in the ACP, VCP, ASDP, or VSDP, for example, can be immediately provided to that data processor from demultiplexer 612 via bus 610. Such a flow-through architecture of the present invention minimizes memory requirements of the decoder since no large buffer storage is needed to store the data before being sent to the data processor. This results in a lower cost for the receiver. Data bus 610 is shown as a serial bus lead DATA in FIG. 6a. However, data bus 610 is preferably a parallel data bus, for example, at least one byte (8 leads) wide.

Moreover, the data bus 610 is flexible and has a structure which allows the system to be easily configured at the user's end in order to support the specific combination of data services desired by that user. In addition, the flexible bus structure 610 allows the user to readily change his/her selected data services by merely adding or removing data processors from the bus. Data processors may then comprise "plug-in" modules. Typical data processors known in the art have "enable" pins to which enable control leads may be connected.

The Audio Control Packet ACP (FIG. 9a) determines how the medium data rate services (Audio) are to be demultiplexed. The Audio service is sectioned into byte packets which are then subdivided into a maximum of 64 different audio services. An audio service may be of any information type, including but not limited to MPEG Audio, Sedat Audio, or any other medium data rate service. Demultiplexer 612 determines the ACP by the descriptor header value. The header value will be a binary value of "100010" in the present embodiment. Each packet describes at most 10 audio services. Therefore, to facilitate 64 audio services, 7 packets are required. FIG. 9a shows an example of audio control packet data for describing medium speed (audio) data services included within a particular transmitted frame.

The Audio Service Descriptor Packet ASDP (FIG. 9b) is a non-essential packet for demultiplexer 612, but is used to distinguish between the different audio for the purposes of demultiplexing control. The descriptor header value allows demultiplexer 612 to identify the ASDP. In the present embodiment, each packet describes only one audio service and contains the audio service number which it is to be used with FIG. 9b shows an example of the audio service descriptor packet.

The Video Control Packet VCP (FIG. 10a) determines how the high data rate services (Video) are to be demultiplexed. The video service is sectioned into byte packets which are then subdivided into a maximum of 20 different video services. The video service may be of any information type including but not limited to MPEG Video, HDTV video, or MPEG system data which contains both video and audio. The video header value is used by the demultiplexer 612 to determine the video packet. Each packet describes at most 5 video services, therefore 4 packets are required to facilitate 20 video services. FIG. 10a is an example of a video control word of PACKETS data for describing high speed (video) data services within a particular transmitted frame.

Likewise, the Video Service Descriptor Packet VSDP (FIG. 10b) is a non-essential packet for the demultiplexer, but it is used to distinguish the different videos for the purposes of demultiplexing control. The VSDP is determined to be this packet by the descriptor header value. Each packet describes only one video service and contains the video service number which it is to be used with. FIG. 10b shows an example of a video service descriptor word of PACKETS data for describing high speed (video) data services included within a particular transmitted frame.

Other processors (not shown in FIG. 6a) may be also provided on the bus 610 and may be provided individual enable leads which operate to gate the service data streams into the appropriate service stream processor. A fifth type of peripheral processor that is not shown is an optional service processor for processing optional service data other than data types which may be processed by the data processors 618, 620, 622 and 630. An expansion socket may be provided for expanding the data processing capabilities to other processors not shown. Such an expansion socket is preferably in the form of a connector (usually a female type connector) for receiving a plug-in module. The expansion socket allows additional data processors to be added to the bus 610 with ease, thus providing further system flexibility. FIG. 6a shows leads on bus 610 for one expansion socket, but any number of expansion sockets may be supported by bus 610 and as long as demultiplexer 612 has been designed with the necessary enable leads. As noted above, such an advantageous arrangement allows the data streams to immediately flow through to the peripheral processors, for example, processors 618, 620, 622 and 630 without any requirement for a large buffer memory. The MSC control word (FIG. 8) provides counter data as previously described which, under control of microcontroller 614, is utilized so that demultiplexer 612 actuates ENABLE signals of data bus 610 as appropriate. The counters may be contained within the demultiplexer 612 or microcontroller 614. Demultiplexer 612 is an application specific integrated circuit in the preferred embodiment, but is not limited thereto. Moreover, in a preferred embodiment, demultiplexer 612 is an application specific integrated circuit having the functions of demultiplexer 612, text processor 618 and low speed data processor 622 in a single chip.

Figure 6B:
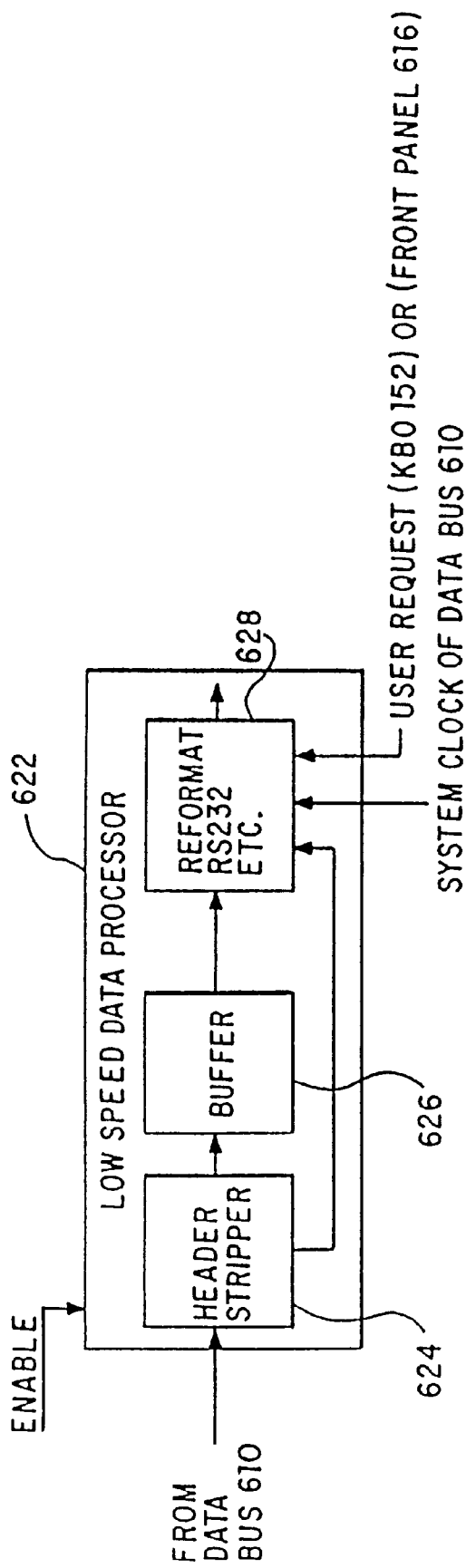
FIG. 6b is a block diagram detailing recovery of low speed data from PACKETS.
Figure 6C:
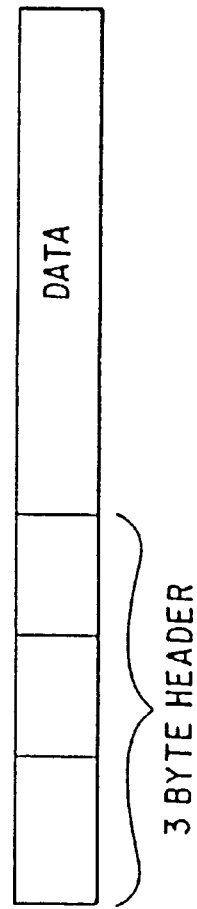
FIG. 6c shows a transmitted data packet for low speed data.

Referring now to FIGS. 6b and 6c, the recovery of low speed data from PACKETS (FIG. 4a or 4b) is further described. FIG. 6b provides particular detail of low speed data processor 622. Low speed data from data bus 610 is enabled via an enable lead to enter header stripper functional block 624. The data payload then is forwarded to buffer 626. Reformatter 628 under control of system clock and user input as to the type of data outputs one or more low speed data streams with reincluded parity, start, stop bits and so on as required.

The transmitted data packet is shown in FIG. 6c and preferably comprises a three byte header (24 bits). The bits are allocated as to packet type (four bits) which, for example, signal RS232 data, four bits for service number, six bits for byte count, two bits for rate trim, three bits for selecting baud rate and the rest spare. The data payload of serial data may, for example, comprise 312 bits (39 bytes), the depicted packet then comprising a total of 42 bytes.

In the present invention, the data processors shown in FIG. 6a are standard chips available from such sources as C-Cube, Texas Instruments, Inc., LSI Logic, and SGS-Thomson-CSF. Utilization of such standard chips further reduces the cost of the unit.

Figure 7:
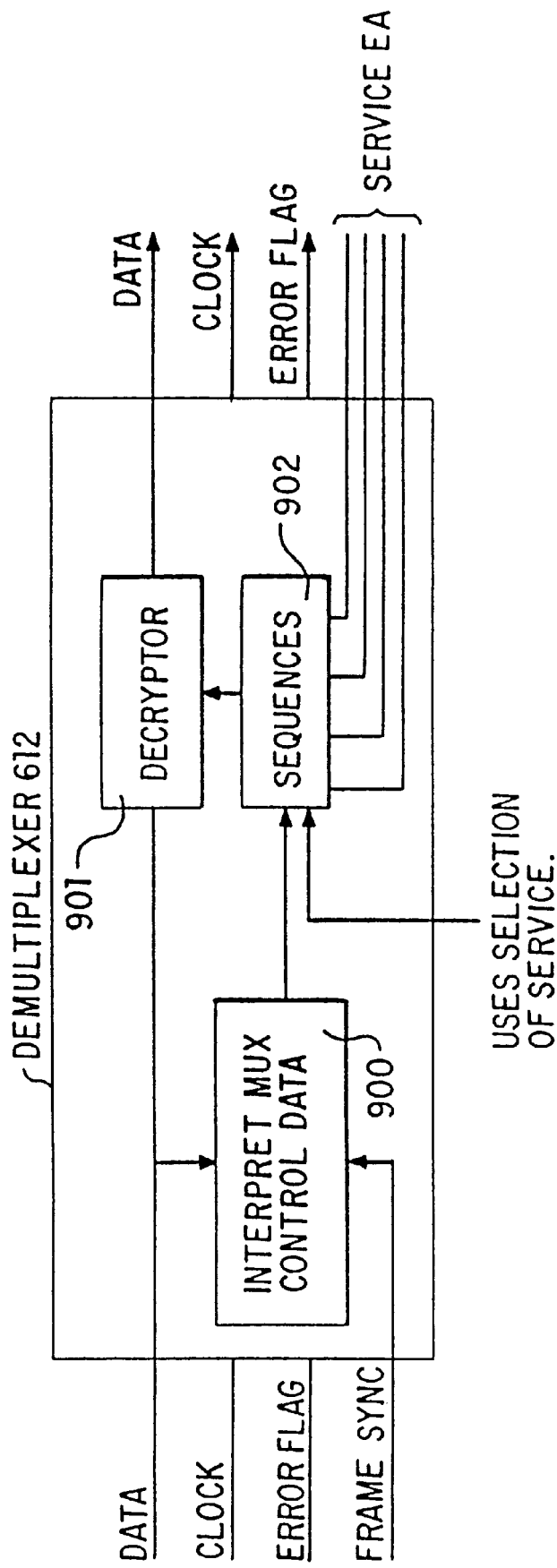

FIG. 7 shows the details of demultiplexer 612. An interpret MUX control data block 900 receives data and frame sync signals input into demultiplexer 612, and, under control of microcontroller 614 (not shown in FIG. 7), identifies the MSC control word in order to determine the information data type so that the appropriate service enable signal can be activated. In a preferred embodiment, the interpret MUX control data block 900 outputs count value parameters to sequence counters in sequencer 902. Sequencer 902 is a flexible counter which initiates a progression through a sequence when it reaches a certain value. The Audio Control Packet ACP, Video Control Packet (VCP), Audio Service Descriptor Packet (ASDP) and Video Service Descriptor Packet (VSDP) are then decoded, and the starting and stopping points of a particular information data stream of one packet data type are identified by the sequence counters' results. In response to a user service selection provided by microcontroller 614 (shown in FIG. 6), sequencer 902 activates an enable signal to enable a proper data processor on bus 601. Sequencer 902 also outputs a signal to decryptor section 901, which also receives the data signal. A decryptor device 901 within 901 which is assigned to the data service which is enabled, decrypts the data signal which is then forwarded to the appropriate enabled data processor on bus 610. Decryptor section 901 which is assigned to the data service which is enabled, decrypts and is required only when a data service has been encrypted.

In the above-described embodiment, the demultiplexer 612 (controlled by microcontroller 614) determines the type of information data being transmitted and enables the specific data processor so that the data can be properly received by that data processor via bus 610 without first being stored in a buffer memory. In an alternative embodiment, a contention algorithm could be run in microcontroller 614, for example, such that each data processor on bus 610 contends for bus access in accordance with a predetermined priority scheme. Further details regarding encryption and decryption are found in copending application U.S. Ser. No. 08/160,827, entitled "System and Method for Providing Compressed Digital Teletext Services and Teletext Support Services" filed Dec. 3, 1993 and which is specifically herein incorporated by reference now U.S. Pat. No. 5,519,780.

As an example, referring to FIG. 7, a user selects a particular data stream which is input to the demultiplexer 612 via a keyboard or a remote control device. By way of example, assume the user has selected satellite channel 36 with Spanish language audio. Once frame sync is achieved as described above, the MSC control word identifies where the selected audio and video is located in the Audio Control Packet ACP and Video Control Packet VCP. The demultiplexer 612 then counts blocks in the audio data stream once the ACP is received in order to select the correct audio data for transmittal via bus 610. Likewise, blocks of video data are counted to select the appropriate video data from the VCP. The sequencer 902 controls the necessary timing operations so that the proper selected audio and video data in this example are send via bus 610 and the appropriate enable leads are activated so that the correct data processors receive their respective information data.

Other variations of the present invention within the scope of the art are also possible, and the present invention is not limited to the specific embodiments noted above.

What is claimed:

1. In a system for receiving a frame of information data preceded by control data describing the information data, the received information data including one or more types of information data, an apparatus comprising:

demultiplexer means for receiving said control data and said information data, and for determining the one or more types of said information data based on said control data, data processor means for processing each type of said information data receivable by the system, and bus means for immediately transporting said information data from the demultiplexer means to said data processor means corresponding to each of the one or more types of information data as determined by said demultiplexer means, wherein said control data is dynamically variable in bit length in accordance with the number of said types of information data in said received frame.

2. Apparatus as claimed in claim 1, wherein said demultiplexer means receives said control data in a packet of data immediately following a frame synchronization pulse and enables an output line connected to said data processor means based on said control data.

3. Apparatus as claimed in claim 1, wherein said demultiplexer means comprises a demultiplexer circuit controlled by a microcontroller.

4. Apparatus as claimed in claim 3, wherein said type of said information data is determined by an interpret MUX control data means in said demultiplexer circuit.

5. Apparatus as claimed in claim 4, wherein said demultiplexer circuit further comprises sequencer means responsive to an output of said interpret MUX control data means, said sequencer means outputting at least one enable signal to activate said data processing means.

6. Apparatus as claimed in claim 5, wherein said demultiplexer circuit further comprises decryptor means for outputting decrypted data to said bus means.

7. Apparatus as claimed in claim 1, further comprising multiple data processor means corresponding to different control data.

8. Apparatus as claimed in claim 1, wherein said bus means comprises a parallel bus structure and a plurality of enabling control leads for activating said data processor means.

9. Apparatus as claimed in claim 1, wherein said demultiplexer means comprises:

interpret MUX control data means for determining said type of said information data and for outputting count value parameters; and sequencer means, responsive to said count value parameters, for providing a count value identifying starting and stopping points in said information data to thereby output at least a portion of said information data to said bus means.

10. Apparatus as claimed in claim 9, further comprising decryptor means for outputting decrypted data to said bus means.

11. A multi-service data receiver architecture comprising:

tuning means for selecting one of a plurality of channels;

demodulator means for demodulating a signal corresponding to said selected channel;

error protection filtering means for filtering said demodulated signal;

means for recovering clock and data information from said demodulated signal, outputting multiplexed digital service data comprising control data and information data, and outputting clock signals, wherein said information data includes one or more types of information data and said control data is dynamically variable in bit length in accordance with the number of said types of information data in said received frame;

decoder means for decoding said multiplexed digital service data;

demultiplexer means responsive to said clock signals for receiving said decoded digital service data, and for evaluating said control data to determine the one or more types of said information data;

data processor means for processing each type of said information data receivable by the system; and bus means for receiving and transporting said information data from said demultiplexer means to said data processor means corresponding to each of the one or more types of information data as determined by said demultiplexer means.

12. Architecture as claimed in claim 11, wherein said demultiplexer means comprises:

interpret MUX control data means for determining said type of said information data and for outputting count value parameters; and sequencer means, responsive to said count value parameters, for providing a count value identifying starting and stopping points in said information data to thereby output at least a portion of said information data to said bus means.

13. Architecture as claimed in claim 12, further comprising decryptor means for outputting decrypted data to said bus means.

14. Architecture as claimed in claim 11, wherein said bus means comprises a parallel bus structure and a plurality of enabling control leads for activating said data processor means.

15. Architecture as claimed in claim 11, wherein said data processing means comprises at least one of a video processor, audio processor, low speed data processor, and text processor.

16. A method for receiving digital programs in a digital service transmission system capable of delivering multiple error-corrected data services comprising the steps of:

obtaining frame synchronization;

locating multiplex structure information;

decoding said multiplex structure information;

determining one or more types of data based on said multiplex structure information, said multiplex structure information being dynamically variable in bit length in accordance with the number of said types of information data in said received frame;

determining a beginning and end of each type of said data; and enabling one or more data processors corresponding to the determined one or more types of data immediately to receive said data upon completion of said determining steps.

17. In a system for receiving a frame of information data preceded by control data describing the information data, an apparatus comprising:

demultiplexer means for receiving said control data and said information data, and for determining a type of said information data based on said control data, said control data being dynamically variable in bit length in accordance with the number of types of information data in said received frame;

bus means for immediately transporting said information data from the demultiplexer means to data processor means when said type of said information data is determined, wherein said demultiplexer means includes interpret MUX control data means for determining said type of said information data and for outputting count value parameters and sequencer means, responsive to said count parameters, for providing a count value identifying starting and stopping points in said information data to thereby output at least a portion of said information data to said bus means.

18. An apparatus according to claim 17, wherein said demultiplexer means receives said control data in a packet of data immediately following a frame synchronization pulse and enables an output line connected to said data processor means based on said control data.

19. An apparatus according to claim 17, wherein said demultiplexer means comprises a demultiplexer circuit controlled by a microprocessor.

20. An apparatus according to claim 19, wherein said interpret MUX control data means is in said demultiplexer circuit.

21. An apparatus according to claim 20, wherein said sequencer means outputs at least one enable signal to activate said data processing means.

22. An apparatus according to claim 21, wherein said demultiplexer circuit further comprises decryptor means for outputting decrypted data to said bus means.

23. An apparatus according to claim 17, further comprising multiple data processor means corresponding to different control data.

24. A multi-service data receiver architecture comprising:

a tuner for selecting one of a plurality of channels;

a demodulator for demodulating a signal corresponding to said selected channel;

an error protection filtering circuit for filtering said demodulated signal;

a controller for recovering clock and data information from said demodulated signal and for outputting multiplexed digital service data comprising control data and information data and for outputting clock signals, said information data including one or more types of information data and said control data being dynamically variable in bit length in accordance with the number of said types of said information data;

a decoder for decoding said multiplexed digital service data;

a demultiplexer responsive to said clock signals for receiving said decoded digital service data, and for evaluating said control data to determine the one or more types of said information data;

a data processor for processing each type of said information data receivable by the system; and a bus for receiving and transporting said information data from said demultiplexer to said data processor corresponding to each of the one or more types of information data as determined by said demultiplexer.

25. Architecture as claimed in claim 24, wherein said demultiplexer comprises:

an interpret MUX control data circuit for determining said type of said information data and for outputting count value parameters; and a sequencer, responsive to said count value parameters, for providing a count value identifying starting and stopping points in said information data to thereby output at least a portion of said information data to said bus.

26. Architecture as claimed in claim 25, further comprising a decryptor circuit for outputting decrypted data to said bus.

27. Architecture as claimed in claim 24, wherein said bus comprises a parallel bus structure and a plurality of enabling control leads for activating said data processor.

28. Architecture as claimed in claim 24, wherein said data processor comprises at least one of a video processor, audio processor, low speed data processor, and text processor.

29. In a system for receiving a frame of information data preceded by control data describing one or more types of information data in said frame, an apparatus comprising:

a demultiplexer for receiving said control data and said information data, and for determining a type of said information data based on said control data; and a bus for immediately transporting said information data from the demultiplexer to a data processor when said type of said information data is determined, wherein said demultiplexer includes an interpret MUX control data circuit for determining said type of said information data and for outputting count value parameters and a sequencer, responsive to said count parameters, for providing a count value identifying starting and stopping points in said information data to thereby output at least a portion of said information data to said bus.

30. An apparatus according to claim 29, wherein said demultiplexer receives said control data in a packet of data immediately following a frame synchronization pulse and enables an output line connected to said data processor based on said control data.

31. An apparatus according to claim 29, wherein said demultiplexer comprises a demultiplexer circuit controlled by a microprocessor.

32. An apparatus according to claim 31, wherein said interpret MUX control data circuit is in said demultiplexer circuit.

33. An apparatus according to claim 32, wherein said sequencer outputs at least one enable signal to activate said data processor.

34. An apparatus according to claim 33, wherein said demultiplexer circuit further comprises a decryptor circuit for outputting decrypted data to said bus.

35. An apparatus according to claim 29, further comprising multiple data processors corresponding to different control data.

36. In a system for receiving information data preceded by control data describing the information data, the received information data including one or more types of information data, an apparatus comprising:

demultiplexer means for receiving said control data and said information data, and for determining the one or more types of said information data based on said control data, data processor means for processing each type of said information data receivable by the system, and bus means for immediately transporting said information data from the demultiplexer means to said data processor means corresponding to each of the one or more types of information data as determined by said demultiplexer means, wherein said control data is dynamically variable in bit length in accordance with the number of said types of information data.

37. Apparatus as claimed in claim 36, wherein said demultiplexer means receives said control data in a packet of data immediately following a synchronization pulse and enables and output line connected to said data processor means based on said control data.

38. Apparatus as claimed in claim 36, wherein said demultiplexer means comprises a demultiplexer circuit controlled by a microcontroller.

39. Apparatus as claimed in claim 38, wherein said type of said information data is determined by an interpret MUX control data means in said demultiplexer circuit.

40. Apparatus as claimed in claim 39, wherein said demultiplexer circuit further comprises sequencer means responsive to an output of said interpret MUX control data means, said sequencer means outputting at least one enable signal to activate said data processing means.

41. Apparatus as claimed in claim 40, wherein said demultiplexer circuit further comprises decryptor means for outputting decrypted data to said bus means.

42. Apparatus as claimed in claim 36, further comprising multiple data processor means corresponding to different control data.

43. Apparatus as claimed in claim 36, wherein said bus means comprises a parallel bus structure and a plurality of enabling control leads for activating said data processor means.

44. Apparatus as claimed in claim 36, wherein said demultiplexer means comprises:

interpret MUX control data means for determining said type of said information data and for outputting count value parameters; and sequencer means, responsive to said count value parameters, for providing a count value identifying starting and stopping points in said information data to thereby output at least a demultiplexed portion of said information data to said bus means.

45. Apparatus as claimed in claim 44, further comprising decryptor means for outputting decrypted data to said bus means.

46. Apparatus as claimed in claim 36 wherein said information data preceded by control data comprises a data stream.

47. Apparatus as claimed in claim 46 wherein said data stream comprises a sequence of frames, each frame comprising information data preceded by control data.

48. Apparatus as claimed in claim 36 wherein each type of data corresponds to a different data service.

49. Apparatus as claimed in claim 48 wherein said bus means comprises a parallel bus structure and a plurality of enabling control leads, each control lead for activating one of a plurality of data processor means for processing a different data service.

50. A multi-service data receiver architecture comprising:
tuning means for selecting one of a plurality of channels;
demodulator means for demodulating a signal corresponding to said selected channel;
error protection filtering means for filtering said demodulated signal;
means for recovering clock and data information from said demodulated signal, outputting multiplexed digital service data comprising control data and information data, and outputting clock signals, wherein said information data includes one or more types of information data and said control data is dynamically variable in bit length in accordance with the number of said types of information data;
decoder means for decoding said multiplexed digital service data;
demultiplexer means responsive to said clock signals for receiving said decoded digital service data, and for evaluating said control data to determine the one or more types of said information data;
data processor means for processing each type of said information data receivable by the system; and
bus means for receiving and transporting said information data from said demultiplexer means to said data processor means corresponding to each of the one or more types of information data as determined by said demultiplexer means.

51. Architecture as claimed in claim 50, wherein said demultiplexer means comprises:
interpret MUX control data means for determining said type of said information data and for outputting count value parameters; and
sequencer means, responsive to said count value parameters, for providing a count value identifying starting and stopping points in said information data to thereby output at least a demultiplexed portion of said information data to said bus means.

52. Architecture as claimed in claim 51, further comprising decryptor means for outputting decrypted data to said bus means.

53. Architecture as claimed in claim 50, wherein said bus comprises a parallel bus structure and a plurality of enabling control leads for activating said data processor means.

54. Architecture as claimed in claim 50, wherein said data processing means comprises at least one of a video processor, audio processor, low speed data processor, and text processor.

55. A method for receiving digital programs in a digital service transmission system capable of delivering multiple error-corrected data services comprising the steps of:
obtaining synchronization;
locating control data;
decoding said control data;
determining one or more types of information data based on said control data, said control data being dynamically variable in bit length in accordance with the number of said types of information data;
determining a beginning and end of each type of said information data; and
enabling one or more data processors corresponding to the determined one or more types of information data immediately to receive said information data upon completion of said determining steps.

56. In a system for receiving information data preceded by control data describing the information data, an apparatus comprising:
demultiplexer means for receiving said control data and said information data, and for determining a type of said information data based on said control data, said control data being dynamically variable in bit length in accordance with the number of types of information data;
bus means for immediately transporting said information data from the demultiplexer means to data processor means when said type of said information data is determined,
wherein said demultiplexer means includes interpret MUX control data means for determining said type of said information data and for outputting count value parameters and sequencer means, responsive to said count parameters, for providing a count value identifying starting and stopping points in said information data to thereby output at least a demultiplexed portion of said information data to said bus means.

57. An apparatus according to claim 56, wherein said demultiplexer means receives said control data in a packet of data immediately following a synchronization pulse and enables an output line connected to said data processor means based on said control data.

58. An apparatus according to claim 56, wherein said demultiplexer means comprises a demultiplexer circuit controlled by a microprocessor.

59. An apparatus according to claim 58, wherein said interpret MUX control data means is in said demultiplexer circuit.

60. An apparatus according to claim 59, wherein said sequencer means outputs at least one enable signal to activate said data processing means.

61. An apparatus according to claim 60, wherein said demultiplexer circuit further comprises decryptor means for outputting decrypted data to said bus means.

62. An apparatus according to claim 56, further comprising multiple data processor means corresponding to different control data.

63. A multi-service data receiver architecture comprising:
a controller for recovering clock and data information from said demodulated signal and for outputting multiplexed digital service data comprising control data and information data and for outputting clock signals, said information data including one or more different information data services and said control data being dynamically variable in bit length in accordance with the number of different information data services;
a decoder for decoding said multiplexed digital service data;
a demultiplexer responsive to said clock signals for receiving said decoded digital service data, and for evaluating said control data to determine the different information data services;
a plurality of data processors for processing information data receivable by the system; and
a bus for receiving and transporting said information data from said demultiplexer to a selected data processor corresponding to a different information data service as determined by said demultiplexer.

64. Architecture as claimed in claim 63, wherein said demultiplexer comprises:

an interpret MUX control data circuit for determining said different information data services and for outputting count value parameters; and a sequencer, responsive to said count value parameters, for providing a count value identifying starting and stopping points in said information data to thereby output at least a demultiplexed portion of said information data to said bus.

65. Architecture as claimed in claim 64, further comprising a decryptor circuit for outputting decrypted data to said bus.

66. Architecture as claimed in claim 63, wherein said bus comprises a parallel bus structure and a plurality of control leads for separately activating said plurality of data processors.

67. In a system for receiving information data preceded by control data describing different information data services comprising said information data, an apparatus comprising:

a demultiplexes for receiving said control data and said information data, and for determining said different information data services based on said control data, said control data being dynamically variable in bit length in accordance with the number of types of information data; and a bus for transporting said information data from the demultiplexer to a data processor when said different information data service is determined, wherein said demultiplexer includes an interpret MUX control data circuit for determining said different information data service and for outputting count value parameters and a sequencer, responsive to said count parameters, for providing a count value identifying starting and stopping points in said information data to thereby output at least a demultiplexed portion of said information data to said bus.

68. An apparatus according to claim 67, wherein said demultiplexer receives said control data in a packet of data following a synchronization pulse and enables an output line connected to said data processor based on said control data.

69. An apparatus according to claim 67, wherein said demultiplexer comprises a demultiplexer circuit controlled by a microprocessor.

70. An apparatus according to claim 67, wherein said interpret MUX control data circuit comprises a circuit portion of said demultiplexer circuit.

71. An apparatus according to claim 32, wherein said sequencer outputs at least one enable signal to activate said data processor.

72. An apparatus according to claim 71, wherein said demultiplexer circuit further comprises a decryptor circuit for outputting decrypted data to said bus.

73. An apparatus according to claim 67, further comprising multiple data processors corresponding to different control data.

74. In a multi-service data receiver architecture, circuit apparatus comprising a controller for recovering an information portion of a received signal and outputting multiplexed digital information service data comprising control data and information data, said information data including data representing different data services and said control data being dynamically variable in bit length in accordance with said different data services;

a demultiplexer, responsive to said variable length control data, for determining the different data services and for outputting a demultiplexed portion of said information data to a bus and control signals to a plurality of control leads, said bus for receiving and transporting said demultiplexed portion of said information data to a plurality of data processors, said control leads for receiving and transporting said control signals, and said plurality of data processors coupled to said control leads and coupled in parallel to said bus, different data processors of said plurality of data processors for processing different digital data services responsive to different control leads.

* * * * *